June 29, 1943.  L. J. DORNHOFER  2,322,835
SEAL
Filed June 23, 1941

INVENTOR.
Louis J. Dornhofer
BY:- Spencer, Marzall, Johnston & Cook
attys.

Patented June 29, 1943

2,322,835

UNITED STATES PATENT OFFICE 2,322,835

SEAL

Louis J. Dornhofer, Chicago, Ill., assignor to Rotary Seal Company, Chicago, Ill., a corporation of Illinois Application June 23, 1941, Serial No. 399,262

2 Claims. (Cl. 286—11)

My invention relates in general to seals and sealing and has more particular reference to the sealing of rotating members, such as shafts, pipes and the like, to prevent the escape of fluid outwardly of the rotating member past a wall or journal in which it extends.

An important object of the present invention is to provide a self-contained seal unit comprising elements assembled in a shell or casing whereby the same may be produced as an integrated structure adapted for assembly as a unit on the rotating member.

Another important object is to provide a seal of inexpensive construction, the invention, to this end, contemplating seal elements adapted for assembly in a sheet metal shell of simple configuration; another important object being to provide a seal of the character mentioned, which is adapted to co-operate with a roller bearing race in forming a seal for a shaft or the like supported for rotation in the bearing.

These and numerous other important objects, advantages and inherent functions of the invention will become apparent as the invention is more fully understood from the following description, which, taken in connection with the accompanying drawing, discloses a preferred embodiment of the invention.

Referring to the drawing.

Figure 1:
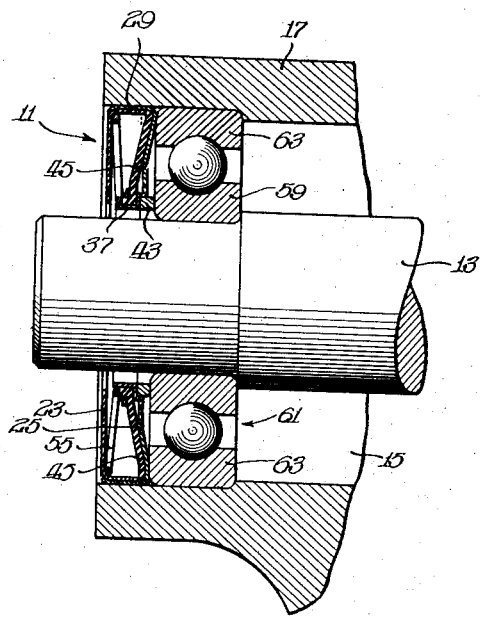
Figure 1 is a sectional view taken through a seal embodying the present invention, the seal being shown assembled in operating position on a rotatable roller bearing supported shaft.

To illustrate my invention, I have shown on the drawing a shaft seal 11 adapted for use on a rotatable shaft or arbor 13, or equivalent turnable member, for sealing the same against leakage along and outwardly of the shaft through the opening 15 in a wall 17 through which the shaft extends. The shaft or arbor to be sealed is usually a solid member having cylindrical outer surfaces, but, of course, may also be a hollow pipe. For this reason, the term "shaft or arbor" should be understood as including hollow pipe as well as solid shaft. Furthermore, the device of my present invention is adapted to seal the space 15 between relatively rotatable arbor and wall members regardless of whether the wall rotates on the stationary shaft or whether the shaft rotates with respect to a stationary wall.

The seal of my present invention is particularly adapted for use in connection with a shaft or arbor having means forming a shoulder or seat thereon and is especially well suited for use as an oil seal applied to the shaft at a roller bearing supporting the same. To this end, the seal, as shown in the drawing, comprises elements assembled and housed within an enclosing casing 19 comprising a pair of interfitting, preferably sheet metal shells 21 and 23, said shells comprising cup-shaped members having end walls and cylindrical side walls formed for interfitting engagement the one within the other. To this end, the member 21 has a dished end wall 25 formed with a central opening 27 and a cylindrical wall 29, while the member 23 has a preferably flat end wall 31 formed with a central opening 33 and a cylindrical wall 35 formed for press-fitted engagement within the wall 29 of the shell 21. The sealing elements within the shells 21 and 23 comprise a cylindrical mounting 37 formed at one end to provide a seat 39 within an annular rim portion 41. The mounting 37 carries a seal ring 43 secured in the seat 39 within the rim 41, the inner diameter of the ring 43 preferably being the same as the inner diameter of the mounting 37, and said ring preferably comprising a relatively soft bearing material, such as bronze or other suitable alloy. The ring 43 is sealingly secured on the mounting 37 as by soldering or brazing the same in the seat 39. The ring and its mounting are disposed within the casing 19 in coaxial alignment with the openings 27 and 33, the ring 43 being supported at and within the opening 27.

The mounting 37 and seal ring 43 thereon are supported within the casing 19 on a flexible diaphragm member 45 forming a resilient mounting gasket, said gasket preferably comprising elastic rubber-like material, such as synthetic rubber. The member 45 includes a cylindrical hub portion 47 which snugly and grippingly surrounds the cylindrical mounting 37 within the casing 19 and adjacent the ring 43, the seat-forming portion 39 of the mounting forming also a seat for the hub of the member 45. The member 45 includes an outstanding flange extending from the hub within the casing 19 to the cylindrical walls thereof, said flange underlying the end wall 25 of the shell 21 and having marginal portions 49 extending to the cylindrical wall 29, said marginal portions 49 being secured by and between the inner end of the wall 35 and the marginal portions of the end wall 25. To this end, the inner edge of the wall 35 may be formed with an inturned annular flange 51, as shown in dotted lines in Figure 2, in order to clampingly engage the peripheral edges of the member 45 and secure the same against the bottom of the member 21. If desired, a squeezing ring 53 may be applied upon the hub portion 47 in order to compress the same upon the cylindrical mounting 37.

Figure 2:
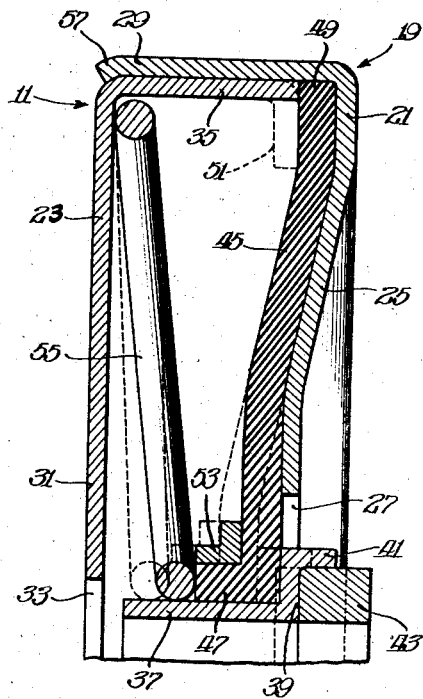
Figure 2 is an enlarged sectional view of the seal unit illustrated in Figure 1.
Figure 3:
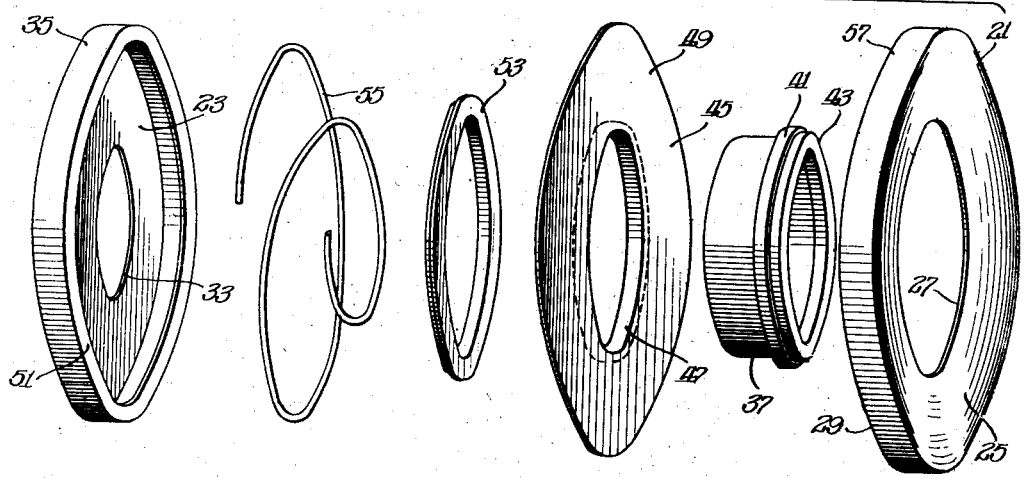
Figure 3 is a perspective view of the elements forming the seal.

Resilient spring means 55 is assembled in the casing 19, said spring means preferably comprising a helical spring element compressible in the direction of the axis of the helix and bearing at one end upon the end wall of the shell 23 and at the other end upon the seal assembly to normally urge the inner portions of the gasket 45, the mounting 37 and the seal ring 43 axially in the casing 19 to present the ring 43 in position extending yieldingly outwardly through the opening 27, as shown in Figure 2 of the drawing. After the parts have been assembled, the edge of the wall 29 of the shell 21 may be peened over, as at 57, upon the shell 23 to hold the parts together.

The seal unit is adapted for press-fitted insertion within the wall opening 15 in position to receive the shaft 13 within the cylindrical mounting 37 and the seal ring 43. It will be noted that the shaft is freely received within the ring and mounting, and the unit is disposed in position in the opening 15 to press the outer surface of the ring 43 upon the facing surface of an abutment 59 on the shaft 13, said facing surface of the abutment being finished to form a ground or running joint with the seal ring 43. Any suitable or preferred means may be employed to form the abutment 59 on the shaft, but I have shown the same as the inner race member of a roller bearing 61, the outer race 63 of which is mounted on the wall 17 in the opening 15 in position forming a stop against which the peripheral portions of the end wall 25 of the casing may be engaged to determine the position of the seal unit in the opening 15, and in this connection, it will be noted that the dished end wall 25 is formed to engage the outer race of the bearing only, leaving the inner race free to rotate with the shaft 13 in position forming a ground joint with the yieldingly presented seal ring 43.

Sealing is accomplished because of the snug press-fitted engagement of the wall 29 in the opening 15, thereby preventing fluid leakage between the member 21 and the wall 17. Leakage between the peripheral edge of the diaphragm 45 and the member 21 is prevented by the clamping action of the wall 35 upon the diaphragm portions 49. Leakage between the hub of the diaphragm member and the mounting 37 is prevented by the tight grip of the hub on the mounting aided by the squeezing action of the ring 53. Leakage between the mounting 37 and the seal ring 43 is prevented by the sealed joint therebetween. Leakage between the ring 43 and the shaft shoulder 59 is prevented by virtue of the ground joint between the shoulder and the ring which is yieldingly pressed upon the shoulder by the action of the spring 55.

It will be noted that the seal unit affords appreciable flexibility whereby to maintain the seal even when, through wear in the bearing 61 or for other causes, appreciable end play or shaft misalignment is encountered. The flexibility of the diaphragm gasket 45 is sufficient to accommodate end play within any limit encountered in service, and the unit will maintain a seal even if the shaft be out of line. In this connection, the action of the spring 55 serves to maintain the seal ring 43 at all times in snug running contact with the sealing surface on the abutment 59, the running joint being maintained despite lateral shaft movement within the limits defined by the inner diameter of the ring.

My invention contemplates the provision of an inexpensive, though rugged, seal structure particularly well adapted for use in connection with shafts supported for rotation in a roller bearing, although obviously applicable to any shaft having suitable annular seat-forming means thereon, whether or not the shaft seat is formed by the inner face of a roller bearing, as in the illustrated embodiment, or otherwise.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A replaceable seal unit for sealing a wall opening around an arbor extending therein and provided with an annular shoulder, comprising sheet metal means forming a housing having a cylindrical wall sized for snug fit in said wall opening and an end wall at one end of the housing, said end wall, toward its center, being inclined inwardly of the end of the housing and being formed with a central opening, a resilient diaphragm of rubber-like material in said housing, said diaphragm having a central opening and being sealed at its margin in said housing at the junction of said cylindrical and of said end walls, with the body of the diaphragm in position to rest upon and be supported by the inner surface of said end wall, with the central portions of the diaphragm disposed at said central opening in the end wall, means extending in the central opening of the diaphragm and forming a seal ring mounting on the diaphragm in position extending through the opening in said end wall and a seal ring supported on said mounting and extending outwardly of the housing through the central opening in said end wall in position to engage said shoulder on the shaft, and spring means in said housing and operable to normally urge said diaphragm toward said end wall.

2. A replaceable seal unit for sealing a wall opening around an arbor extending therein and provided with an annular shoulder, comprising sheet metal means forming a housing having a cylindrical wall sized for snug fit in said wall opening and an end wall at one end of the housing, said end wall, toward its center, being inclined inwardly of the end of the housing and being formed with a central opening, a resilient diaphragm of rubber-like material in said housing, said diaphragm having a central opening and being sealed at its margin in said housing at the junction of said cylindrical and of said end walls, with the body of the diaphragm in position to rest upon and be supported by the inner surface of said end wall, with the central portions of the diaphragm disposed at said central opening in the end wall, means extending in the central opening of the diaphragm and forming a seal ring mounting on the diaphragm in position extending through the opening in said end wall and a seal ring supported on said mounting and extending outwardly of the housing through the central opening in said end wall in position to engage said shoulder on the shaft, and a spiral spring having an outer end mounted on the cylindrical wall of the housing and an inner end engaging the diaphragm adjacent the central opening thereof to normally urge the diaphragm toward said end wall.

LOUIS J. DORNHOFER.